United States Patent
Uemura

[19]

[11] Patent Number: 5,955,971
[45] Date of Patent: Sep. 21, 1999

[54] WINDOW-PASSAGE DETECTION SYSTEM OF AN AIRPLANE

[75] Inventor: Toshimi Uemura, Tokyo, Japan

[73] Assignee: NEC Corporation, Tokyo, Japan

[21] Appl. No.: 09/115,976

[22] Filed: Jul. 15, 1998

[30] Foreign Application Priority Data

Jul. 15, 1997 [JP] Japan ................................. 9-203922

[51] Int. Cl.$^6$ ..................................................... G08G 5/00
[52] U.S. Cl. ........................... 340/947; 340/952; 342/33; 342/35; 342/357; 701/17
[58] Field of Search ................................... 340/947, 952, 340/956; 342/33, 34, 35, 357, 437, 450, 413; 701/16, 17, 18, 300; 244/186, 194

[56] References Cited

U.S. PATENT DOCUMENTS

| | | | |
|---|---|---|---|
| 4,390,949 | 6/1983 | Beningfield et al. | 244/186 |
| 4,894,655 | 1/1990 | Joguet et al. | 340/945 |
| 5,153,587 | 10/1992 | Redlich | 340/947 |
| 5,361,212 | 11/1994 | Class et al. | 340/947 |
| 5,546,095 | 8/1996 | Lopez | 343/703 |
| 5,786,773 | 7/1998 | Murphy | 340/947 |

FOREIGN PATENT DOCUMENTS 3-46581 2/1991 Japan .

OTHER PUBLICATIONS

An Experiment of Approach and Landing According to DGPS; proceedings of 28th symposium of *Electronic Navigation Research Institute, Ministry of Transport* (1996); pp. 13–16—No Translation.

*Primary Examiner*—Brent Swarthout
*Attorney, Agent, or Firm*—Ostrolenk, Faber, Gerb & Soffen, LLP

[57] ABSTRACT

A window-passage detection system has a ground system comprising: a first course generator (3) for generating a horizontal DDM (Differential Depth of Modulation) pattern for defining a horizontal width (25) of a virtual window frame by emitting a first carrier signal and a first side-band signal from a pair of first transmission antennae (6a and 6b), a second course generator (4) for generating a vertical DDM pattern for defining a vertical width (26) of the virtual window frame by emitting a second carrier signal and a second side-band signal from a pair of second transmission antennae (7a and 7b), and a third course generator (5) for generating a longitudinal DDM pattern for defining a longitudinal position (27) of the virtual window frame by emitting a third carrier signal and a third side-band signal from a pair of third transmission antenna (8a and 8b). Pairs of the first to the third transmission antennae (6a to 8b) generate three orthogonal polarization planes. With each pair of antenna, each carrier signal is emitted with the same phase and each side-band signal is emitted with inverted phase. Each carrier signal is amplitude-modulated with addition of a first and a second modulation signal, and each side-band signal is balanced-modulated with differential of the first and the second modulation signal.

6 Claims, 6 Drawing Sheets

WINDOW-PASSAGE DETECTION SYSTEM OF AN AIRPLANE

BACKGROUND OF THE INVENTION

The present invention relates to a window-passage detection system of an airplane for detecting a timing when the airplane passes through a window frame, that is, an appointed space including a category decision height where a final landing decision should be taken when the airplane is to be landing according to precision approach making use of a satellite navigation system, at airborne side and instantaneously at the timing.

Since 1993, the application of GPS (Global Positioning System) to the precision approach landing of the airplane has been studied at AWOP (All Weather Operating Panel) of the ICAO (International Civil Aviation Organization), and RNP (Required Navigation Performance) is proposed there for defining necessary performance for the precision approach landing.

Figure 6:
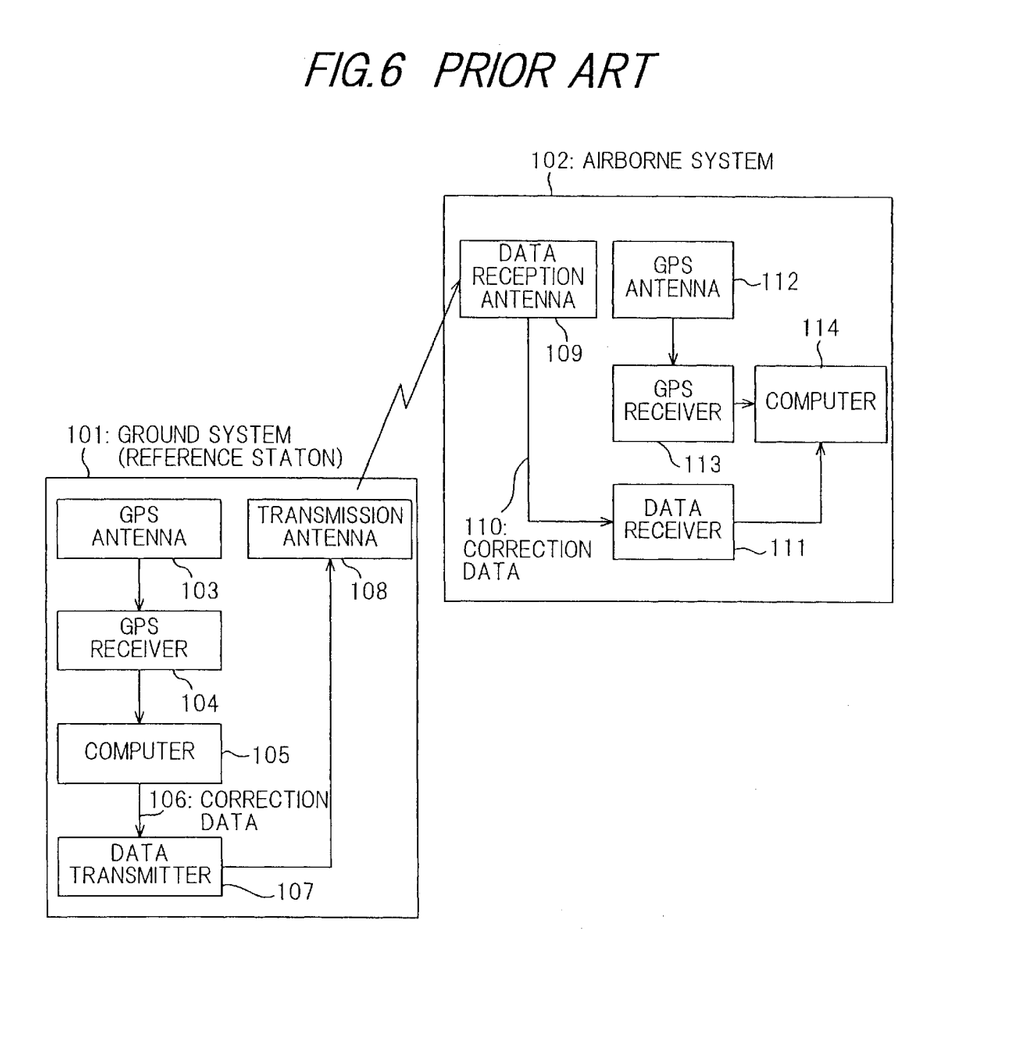
FIG. 6 is a block diagram illustrating a conventional precision approach landing system making use of DGPS.

Referring to FIG. 6, a precision approach landing system making use of DGPS (Differential Global Positioning System) is described, which is considered to give a highest measurement precision among actually available satellite navigation systems.

The DGPS is a technique to improve measurement precision by revising three-dimensional information obtained at a mobile station making use of the pseudo-distance error measured at and transmitted from a reference position whereof precise three-dimensional position is known. Therefore, the transmission of the pseudo-distance error defines the measurement precision of the system.

The DGPS system of FIG. 6 comprises a ground system (reference station) 101 and an airborne system 102. The ground system 101 calculates the pseudo-distance and its differential of each satellite from positional information received by a GPS receiver 104 through a GPS antenna 103 with a computer 105 based on the precise three-dimensional position of the ground system 101 which is beforehand measured. Correction data 106 obtained from the pseudo-distance and its differential is transmitted from a transmission antenna 108 through a data transmitter 107.

In the airborne system 102, positional information calculated from satellite signals received by a GPS receiver 113 through a GPS antenna 112 and correction data 110 received from the ground system (reference station) 101 by a data receiver 111 through a data reception antenna 109 are supplied to a computer 114. The computer 114 obtains its precise position by revising the positional information making use of the correction data 110.

According to experimental data presented in a paper entitled "An Experiment of Approach and Landing according to DGPS", pp. 13–16, proceedings of 28-th symposium of Electronic Navigation Research Institute, Ministry of Transport, the measurement error was about ±5 m in the DGPS system wherein a narrow correlator receiver is applied to each of the GPS receivers 104 and 113, and the correction data 106 is measured and transmitted every 5 seconds according to data format (ASCII) of the GPS receiver 104 from the data transmitter 107 to the data receiver 111 by way of spread spectrum modulation.

On the other hand, the allowable height deviation is ±4.5 m at 30 m height for RNP category 2, and it is ±1.5 m at 15 m height for RNP category 3A, according to the AWOP proposal beforehand described.

Therefore, the DGPS system above described can not give sufficient exactness of cm-order necessary for the precision approach landing of RNP category 2 or RNP category 3A, being unable to exactly detect passage of the inner window frame including the decision height of 30 m of the RNP category 2 or that of 15 m of the RNP category 3A, at airborne side.

It may be considered to improve precision of the DGPS system for dealing with this problem. However, the DGPS systems, which are provided at reference points whereof three-dimensional position is known for transmitting GPS correction data to the airborne users by always measuring pseudo-distance errors of the GPS signals, need considerable maintenance cost without saying of their installation cost. Therefore, further precision improvement of the DGPS systems would require enormous cost.

SUMMARY OF THE INVENTION

Therefore, a primary object of the present invention is to provide a window-passage detection system of an airplane which enables to detect passage of the inner window frame defined in the space including the category decision height appointed in the RNP proposed by AWOP of ICAO, instantaneously at airborne side with precision of cm-order, in cooperation with a future satellite navigation system, such as the DGPS system, which will be the major system when adopted for the precision approach landing.

In order to achieve the object, a ground system of the window-passage detection system according to the invention comprises:

a first course generator for generating a horizontal DDM (Differential Depth of Modulation) pattern for defining a horizontal width of a virtual window frame through which a precision approach landing course of an airplane is set, by emitting a first carrier signal and a first side-band signal at the same time upwards toward the virtual window frame from a pair of first transmission antennae provided under the virtual window frame and arranged horizontally and line-symmetrically to a center line of a runway to generate a polarization plane parallel to a horizontal direction of the virtual window frame;

a second course generator for generating a vertical DDM pattern for defining a vertical width of the virtual window frame, by emitting a second carrier signal and a second side-band signal at the same time in the horizontal direction toward the virtual window frame from a pair of second transmission antennae provided sideways of the virtual window frame and arranged vertically and line-symmetrically to a horizontal line orthogonal to the center line an crossing with the precision approach landing course to generate a polarization plane parallel to a vertical direction of the virtual window frame; and a third course generator for generating a longitudinal DDM pattern for defining a longitudinal position of the virtual window frame, by emitting a third carrier signal and a third side-band signal at the same time in the horizontal direction toward the virtual window frame from a pair of third transmission antennae provided sideways of the virtual window frame and arranged horizontally and line-symmetrically to the horizontal line orthogonal to the center line and crossing with the precision approach landing course to generate a polarization plane parallel to a normal direction of the virtual window frame.

Each of the first to the third carrier signal is obtained by amplitude-modulating each of a first to a third base signal having frequencies a little shifted from each other with the first and the second modulation signal, and each of the first to the third side-band signal is obtained by balanced-modulating corresponding each of the first to the third base signal with the first modulation signal whereof a phase is inverted and the second modulation signal.

One of each pair of the first to the third transmission antennae is supplied with corresponding each of the first to the third side-band signal and corresponding each of the first to the third carrier signal signal, and the other of each pair of the first to the third transmission antennae is supplied with corresponding each of the first to the third side-band signal whereof a phase is inverted and corresponding each of the first to the third carrier signal.

An airborne system of the window-passage detection system according to the invention, which is provided on an airplane, comprises:

a first detector for detecting passage of the airplane inside of the horizontal width of the virtual window frame, from output of a first airborne receiver having a first reception antenna of the same polarization plane with the pair of the first transmission antennae;

a second detector for detecting passage of the airplane inside of the vertical width of the virtual window frame, from output of a second airborne receiver having a second reception antenna of the same polarization plane with the pair of the second transmission antennae;

a third detector for detecting passage of the airplane traversing the longitudinal position of the virtual window frame, from output of a third airborne receiver having a third reception antenna of the same polarization plane with the pair of the third transmission antennae; and an AND detector for detecting passage of the airplane inside of the virtual window frame, from AND logic of outputs of the first to the third detector.

Therefore, the passage of the airplane through the inner window frame appointed in the RNP can be detected instantaneously at airborne side with sufficient precision.

Further, the first to the third course generator can be realized making use of the same technique as is applied to the Localizer or the Glide-Path transmitter, the splitter/synthesizer or the transmission antenna of an actual ILS (Instrument Landing System), and by applying the same technique, ILS airborne receivers actually equipped in the airplane can be used as the first to the third airborne receiver. Therefore, the window-passage detection system of the embodiment can be embodied with a minimum cost. Still further, the accuracy and the reliability of the ILS, which can detect the course deviation or the height deviation of cm-level, are already well proved through flight examinations and the evaluation tests.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

A window-passage detection system of the invention has a ground system 1 and an airborne system 2.

Figure 1A:
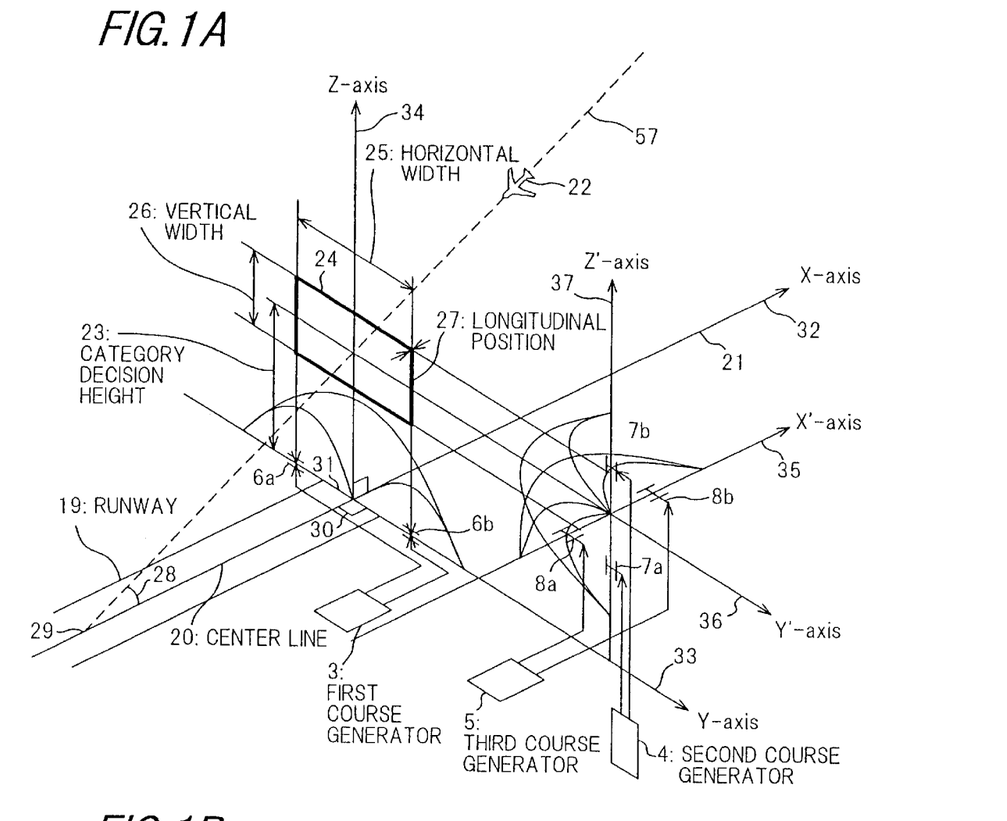
FIG. 1A is a schematic diagram illustrating the ground system 1 according to an embodiment of the invention.

FIG. 1A is a schematic diagram illustrating the ground system 1 according to an embodiment of the invention, comprising:

a first course generator 3 for defining a horizontal width 25 of an appointed space 24 which is to be provided parallel to a first vertical plane perpendicular to a center line 20 of a runway 19 at an end of the runway 19, so that the center of the horizontal width 25 is positioned on a second vertical plane including the center line 20;

a second course generator 4 for defining a vertical width 26 of the appointed space 24, so that the center of the vertical width 26 is positioned on a horizontal plane including a category decision height 23;

a third course generator 5 for defining a longitudinal position 27 of the appointed space 24, so that the longitudinal position 27 coincide with the first vertical plane;

at least one pair of first transmission antennae 6a and 6b connected to the first course generator 3 and arranged on the first vertical plane symmetrically to the second vertical plane;

at least one pair of second transmission antennae 7a and 7b connected to the second course generator 4 and arranged on the first vertical plane symmetrically to the horizontal plane including the category decision height 23; and at least one pair of third transmission antennae 8a and 8b connected to the third course generator 5 and arranged on the horizontal plane including the category decision height 23 symmetrically to the first vertical plane.

Figure 1B:
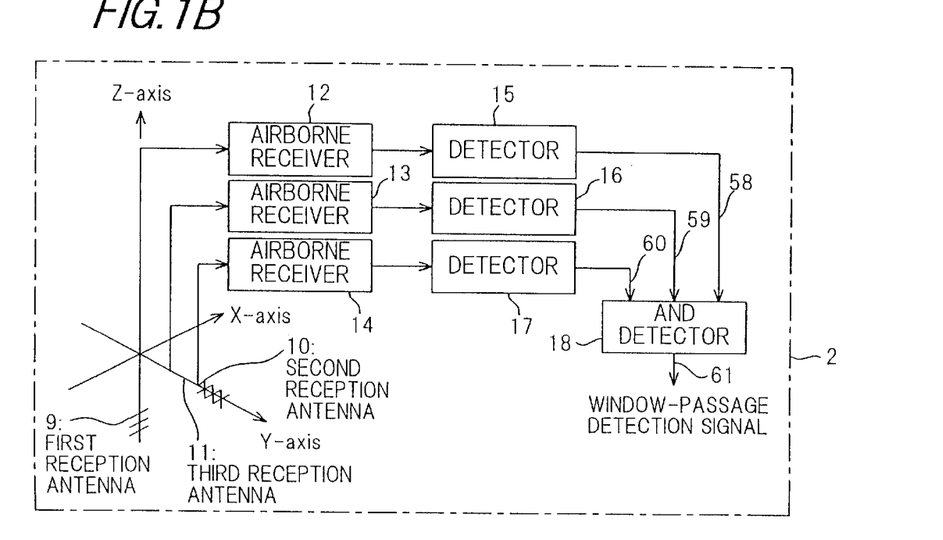
FIG. 1B is a block diagram illustrating the airborne system 2 according to the embodiment.

FIG. 1B is a block diagram illustrating the airborne system 2 according to the embodiment, comprising a first reception antenna 9 having the same polarization plane with the first transmission antennae 6a and 6b, a second reception antenna 10 having the same polarization plane with the second transmission antennae 7a and 7b, a third reception antenna 11 having the same polarization plane with the third transmission antennae 8a and 8b, a first to a third airborne receiver 12 to 14 each connected to each of the first to the third reception antenna 9 to 11, respectively, a first to a third detector 15 to 17 each connected to each of the first to the third airborne receiver 12 to 14, respectively, and an AND detector 18.

Figure 2:
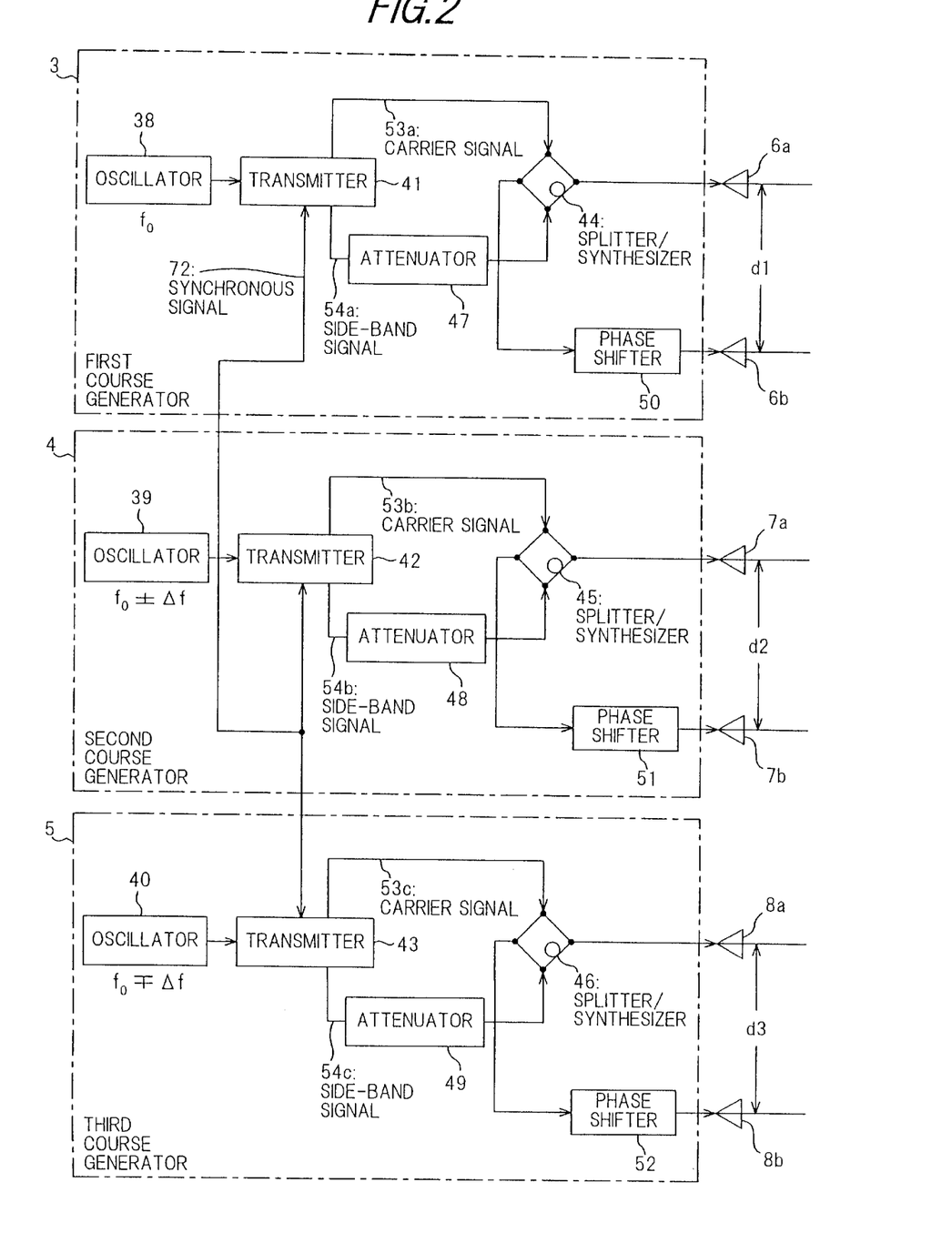
FIG. 2 is a block diagram illustrating a configuration of the first to the third course generator 3 to 5 of FIG. 1A.

FIG. 2 is a block diagram illustrating a configuration of the first to the third course generator 3 to 5.

The first course generator 3 comprises a first oscillator 38 for oscillating a first base frequency of $f_0$, a first transmitter 41 for generating a first carrier signal 53a and a first side-band signal 54a by amplitude-modulating and balanced-modulating the first base frequency $f_0$ with a first and a second modulation signal (90 and 150 Hz having the same amplitude, for example), a first attenuator 47 for attenuating amplitude of the first side-band signal 54a, a first splitter/synthesizer 44 for splitting and synthesizing the first carrier signal 53a and the first side-band signal 54a after attenuated by the first attenuator 47, and a first phase shifter 50 for adjusting phase difference between two synthesized signals output from the first splitter/synthesizer 44 each to be supplied to each of the first transmission antennae 6a and 6b.

The second course generator 4 comprises a second oscillator 39 for ocsillating a second base frequency of $f_0 \pm \Delta f$ a little shifted from the first base frequency $f_0$, a second transmitter 42 for generating a second carrier signal 53b and a second side-band signal 54b by amplitude-modulating and balanced-modulating the second base frequency $f_0 \pm \Delta f$ with the first and the second modulation signal, a second attenuator 48 for attenuating amplitude of the second side-band signal 54b, a second splitter/synthesizer 45 for splitting and synthesizing the second carrier signal 53b and the second side-band signal 54b after attenuated by the second attenuator 48, and a second phase shifter 51 for adjusting phase difference between two synthesized signals output from the second splitter/synthesizer 45 each to be supplied to each of the second transmission antennae 7a and 7b.

Similarly, the third course generator 5 comprises a third oscillator 40 for oscillating a third base frequency of $f_0 \mp \Delta f$ a little shifted from the first base frequency $f_0$ to the other side than the second base frequency $f_0 \pm \Delta f$, a third transmitter 43 for generating a third carrier signal 53c and a third side-band signal 54c by amplitude-modulating and balanced-modulating the third base frequency $f_0 \mp \Delta f$ with the first and the second modulation signal, a third attenuator 49 for attenuating amplitude of the third side-band signal 54c, a third splitter/synthesizer 46 for splitting and synthesizing the third carrier signal 53c and the second side-band signal 54c after attenuated by the third attenuator 49, and a third phase shifter 52 for adjusting phase difference between two synthesized signals output from the third splitter/synthesizer 46 each to be supplied to each of the third transmission antennae 8a and 8b.

Figure 3A:
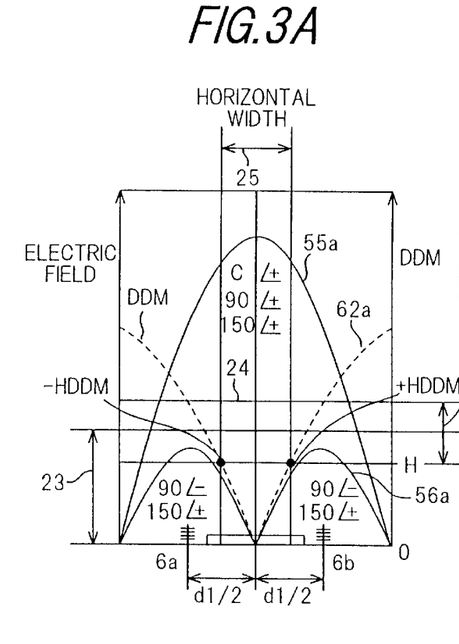
FIG. 3A is a graphic chart schematically illustrating electric field patterns (55a and 56a) and a DDM (Differential Depth of Modulation) pattern (62a) generated by the first course generator 3 of FIG. 1.
Figure 3B:
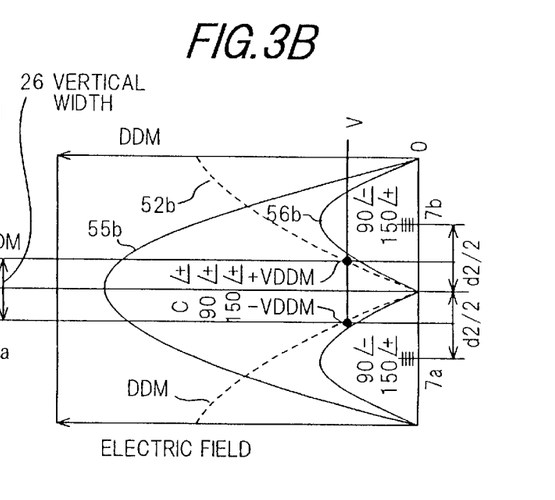
FIG. 3B is a graphic chart schematically illustrating electric field patterns (55b and 56b) and a DDM pattern (62b) generated by the second course generator 4.
Figure 3C:
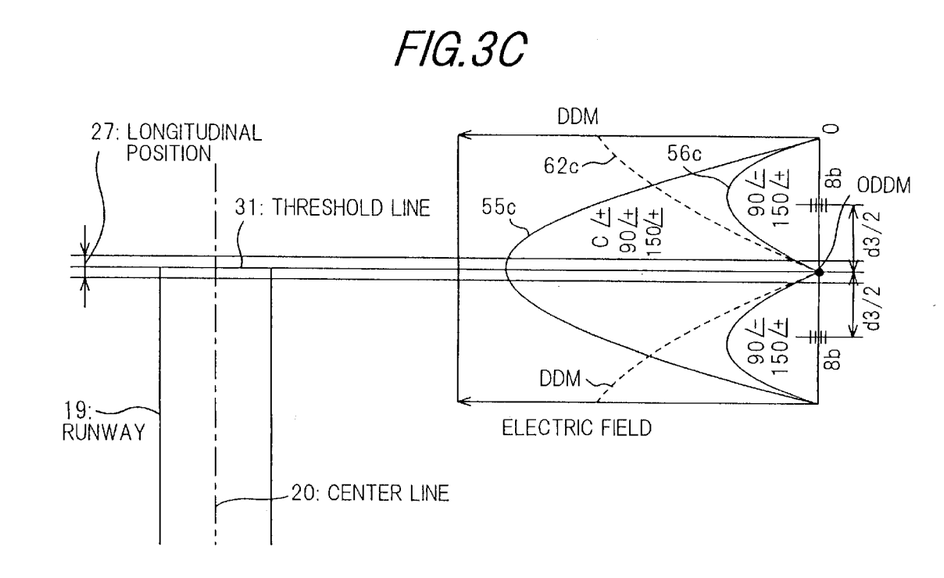
FIG. 3C is a graphic chart schematically illustrating electric field patterns (55c and 56c) and a DDM pattern (62c) generated by the third course generator 5.

FIG. 3A is a graphic chart schematically illustrating electric field patterns (55a and 56a) and a DDM (Differential Depth of Modulation) pattern (62a) generated by the first course generator 3 of FIG. 1 on the first vertical plane. FIG. 3B is a graphic chart schematically illustrating electric field patterns (55b and 56b) and a DDM pattern (62b) generated by the second course generator 4 on the first vertical plane, too. And FIG. 3C is a graphic chart schematically illustrating electric field patterns (55c and 56c) and a DDM pattern (62c) generated by the second course generator 5 on the horizontal plane including the category decision height 23.

Figure 4:
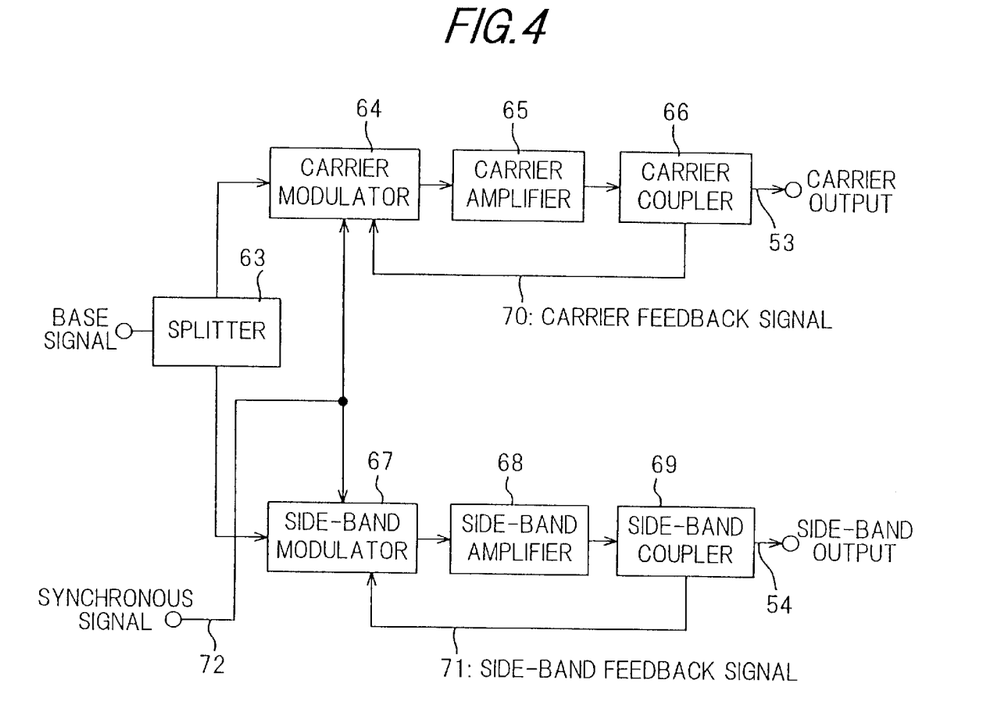
FIG. 4 is a block diagram illustrating the first to the third transmitter 41 to 43 of FIG. 1 having the same configuration.

FIG. 4 is a block diagram illustrating the first to the third transmitter 41 to 43 having the same configuration, each comprising a splitter 63 for splitting respective each of the first to the third base frequency supplied thereto into two signals, a carrier modulator 64 for generating a carrier signal by modulating one of the two signals with the first and the second modulation signal synchronized to a synchronous signal 72, a carrier amplifier 65 for amplifying the carrier signal, a carrier coupler 66 for obtaining a carrier feedback signal 70 from the carrier signal 53 to be output as respective each of the first to the third carrier signal 53a to 53c, a side-band modulator 67 for generating a side-band signal by modulating the other of the two signals split by the splitter 63 with the first and the second modulation signal, a side-band amplifier 68 for amplifying the side-band signal, and a side-band coupler 69 for obtaining a side-band feedback signal 71 from the side-band signal 54 to be output as respective each of the first to the third side-band signal 54a to 54c.

Now, operation of the embodiment is described referring to FIGS. 1A to 3C.

The horizontal width 25 of the appointed space 24 including the category decision height 23 is detected by receiving the electric field 55a of the first carrier signal 53a and the electric field 56a of the first side-band signal 54a emitted at the same time from the first transmission antennae 6a and 6b by way of the first reception antenna 9 of the airborne system 2 having the same polarization plane with the first transmission antennae 6a and 6b.

The first carrier signal 53a generated by the first transmitter 41 is supplied to the first splitter/synthesizer 44 and splitted into two signals, whereof one is supplied directly to one (6a) of the first transmission antennae and the other is supplied to the other (6b) of the first transmission antennae through the first phase shifter 50. On the other hand, the first side-band signal 54a generated by the first transmitter 41 is supplied to the first splitter/synthesizer 44 through the first attenuator 47 and splitted into two signals, whereof one is supplied to said one (6a) of the first transmission antennae after inverted, that is, phase-shifted by 180°, and the other is supplied to the other (6b) of the first transmission antennae through the first phase shifter 50.

Therefore, the first carrier signal 53a is emitted with the same phase form both of the first transmission antennae 6a and 6b which are arranged symmetrically to the second vertical plane including the center line 20 of the runway 19, generating an electric field pattern having single peak above the center line 20 as represented by the electric field pattern 55a of FIG. 3A.

On the other hand, phase of the first side-band signal 54a emitted from each of the first transmission antennae 6a and 6b is 180° different with each other. Therefore, an electric field pattern having two peaks, as represented by the electric field pattern 56a of FIG. 3A, is generated giving null field above the center line 20. The first phase shifter 50 is provided for so adjusting the phase of the first side-band signal 54a to be supplied to the other (6b) of the first transmission antennae that the side-band null plane coincides with the second vertical plane.

The first airborne receiver 12 detects its course by comparing modulation depths of the first and the second modulation signal obtained from the electric field 55a of the first carrier signal 53a and the electric field 56a of the first side-band signal 54a.

For example, just above an extension 21 of the center line 20, the first airborne receiver 12 receives only the electric field 55a of the first carrier signal 53a, wherein modulation depths of the first and the second modulation signal are the same, and the first airborne receiver 12 outputs 0 DDM, indicating to be just on the course.

When the airplane 22 is positioned at right side of the center of the appointed space 24 (of FIG. 3A), electric field of the first side-band signal 54a emitted from the other (6b) of the first transmission antennae, and consequently, the first modulation signal (90 Hz, in the example) becomes dominant, giving a positive DDM value. At the right edge of the appointed space 24, the DDM value shows a right allowable limit +HDDM. When the airplane 22 is positioned at left side of the center of the appointed space 24, the second modulation signal (150 Hz, in the example) becomes dominant, giving a negative DDM value. At the left edge of the appointed space 24, the DDM values shows a left allowable limit −HDDM.

Here, the DDM value is given as follows;

$$DDM=(M90-M150)/C,$$

M90, M150 and C being amplitude of the first modulation signal, the second modulation signal and their carrier signal (the first base frequency $f_0$, here), respectively. Having excellent AGC (Auto Gain Control) characteristic, the first airborne receiver 12 outputs a signal just in proportion to the DDM.

The limit value of the horizontal DDM (±HDDM), corresponding to the horizontal width 25 of the appointed space 24, is adjusted by controlling the comparative intensity of the electric field 56a of the first side-band signal 54a by way of the first attenuator 47 of the first course generator 3.

Detection of the vertical width 26 of the appointed space 24 is performed similarly, that is, by receiving the electric field 55b of the second carrier signal 53b and the electric field 56b of the second side-band signal 54b emitted at the same time from the second transmission antennae 7a and 7b by way of the second reception antenna 10 of the airborne system 2 having the same polarization plane with the second transmission antennae 7a and 7b.

The second carrier signal 53b generated by the second transmitter 42 is supplied to the second splitter/synthesizer 45 and splitted into two signals, whereof one is supplied directly to one (7a) of the second transmission antennae and the other is supplied to the other (7b) of the second transmission antennae through the second phase shifter 51. On the other hand, the second side-band signal 54b generated by the second transmitter 42 is supplied to the second splitter/synthesizer 45 through the second attenuator 48 and splitted into two signals, whereof one is supplied to said one (7a) of the second transmission antennae after inverted, that is, phase-shifted by 180°, and the other is supplied to the other (7b) of the second transmission antennae through the second phase shifter 51.

Therefore, the second carrier signal 53b is emitted with the same phase form both of the second transmission antennae 7a and 7b which are arranged on the first vertical plane symmetrically to the horizontal plane including the category decision height 23 at a position appropriately offset from the second vertical plane including the center line 20 of the runway 19, and generates an electric field pattern having single peak at the category decision height 23 as represented by the electric field pattern 55b of FIG. 3B.

On the other hand, phase of the second side-band signal 54b emitted from each of the second transmission antennae 7a and 7b is 180° different with each other. Therefore, an electric field pattern having two peaks, as represented by the electric field pattern 56b of FIG. 3B, is generated giving null field at the category decision height 23. The second phase shifter 51 is provided for so adjusting the phase of the second side-band signal 54b to be supplied to the other (7b) of the second transmission antennae that the side-band null plane coincides with the horizontal plane including the category decision height 23.

The second airborne receiver 13 detects its course by comparing modulation depths of the first and the second modulation signal obtained from the electric field 55b of the second carrier signal 53b and the electric field 56b of the second side-band signal 54b.

For example, just at the category decision height 23, the second airborne receiver 13 receives only the electric field 55b of the second carrier signal 53b, wherein modulation depths of the first and the second modulation signal are the same, and the second airborne receiver 13 outputs 0 DDM, indicating to be just on the course.

When the airplane 22 is positioned higher than the center of the appointed space 24 (of FIG. 3B), electric field of the second side-band signal 54b emitted from the other (7b) of the second transmission antennae, and consequently, the first modulation signal (90 Hz, in the example) becomes dominant, giving a positive DDM value. At the upper edge of the appointed space 24, the DDM value shows an upper allowable limit +VDDM. When the airplane 22 is positioned lower than the center of the appointed space 24, the second modulation signal (150 Hz, in the example) becomes dominant, giving a negative DDM value. At the lower edge of the appointed space 24, the DDM value shows a lower allowable limit −VDDM.

The limit value of the vertical DDM (±VDDM), corresponding to the vertical width 26 of the appointed space 24, is adjusted by controlling the comparative intensity of the electric field 56b of the second side-band signal 54b by way of the second attenuator 48 of the second course generator 4.

As to the detection of the longitudinal position 27 of the appointed space 24, it is also performed by receiving the electric field 55c of the third carrier signal 53c and the electric field 56c of the third side-band signal 54c emitted at the same time from the third transmission antennae 8a and 8b by way of the third reception antenna 11 of the airborne system 2 having the same polarization plane with the third transmission antennae 8a and 8b.

The third carrier signal 53c generated by the third transmitter 43 is supplied to the third splitter/synthesizer 46 and splitted into two signals, whereof one is supplied directly to one (8a) of the third transmission antennae and the other is supplied to the other (8b) of the third transmission antennae through the third phase shifter 52. On the other hand, the third side-band signal 54c generated by the third transmitter 43 is supplied to the third splitter/synthesizer 46 through the third attenuator 49 and splitted into two signals, whereof one is supplied to said one (8a) of the third transmission antennae after inverted, that is, phase-shifted by 180°, and the other is supplied to the other (8b) of the second transmission antennae through the third phase shifter 52.

Therefore, the third carrier signal 53c is emitted with the same phase form both of the third transmission antennae 8a and 8b which are arranged on the horizontal plane including the category decision height 23 symmetrically to the first vertical plane at a position appropriately offset from the second vertical plane including the center line 20 of the runway 19, and generates an electric field pattern having single peak on the first vertical plane, that is, above a threshold line 31 perpendicular to the center line 20 at the end of the runway 19, as represented by the electric field pattern 55c of FIG. 3C.

On the other hand, phase of the third side-band signal 54c emitted from each of the third transmission antennae 8a and 8b is 180° different with each other. Therefore, an electric field pattern having two peaks, as represented by the electric field pattern 56c of FIG. 3C, is generated giving null field on the first vertical plane. The third phase shifter 52 is provided for so adjusting the phase of the third side-band signal 54c to be supplied to the other (8b) of the third transmission antennae that the side-band null plane coincides with the first vertical plane.

The third airborne receiver 14 detects its course by comparing modulation depths of the first and the second modulation signal obtained from the electric field 55c of the third carrier signal 53c and the electric field 56c of the third side-band signal 54c.

For example, just above the threshold line 31, the third airborne receiver 14 receives only the electric field 55c of the third carrier signal 53c, wherein modulation depths of the first and the second modulation signal are the same, and the third airborne receiver 14 outputs 0 DDM, indicating to be just above the threshold line 31.

The limit value of the longitudinal DDM corresponding to the depth of the appointed space 24, might be adjusted by controlling the comparative intensity of the electric field 56c of the third side-band signal 54c by way of the third attenuator 49 of the third course generator 5. However, usually, the depth is not adjusted because the narrower the depth is, the more precise detection of the window passage can be performed.

When the airplane 22 passes the longitudinal position of the window frame, that is, above the threshold line 31, a threshold passing signal 60 output from the third detector 17 of the airborne system 2 is enabled by detecting 0 DDM output of the third airborne receiver 17. A horizontal width detection signal 58 output from the first detector 15 is enabled when output of the first airborne receiver 12 is within the horizontal limit ±HDDM, and a vertical width signal 59 output from the second detector 16 is enabled when output of the second airborne receiver 13 is within the vertical limit ±VDDM. The AND detector 18 checks whether both the horizontal width signal 58 and the vertical width signal 59 are enabled or not when the threshold passing signal 60 is enabled.

Thus, when the horizontal and the vertical width signal 58 and 59 and the threshold passing signal 60 are all enabled at the same time, the AND detector 18 outputs a window-passage detection signal 61.

Here, it is to be noted that the above first to the third course generator 3 to 5 can be realized making use of the same technique as is applied to the Localizer or the Glide-Path transmitter, the splitter/synthesizer or the transmission antenna of an actual ILS (Instrument Landing System), and by applying the same technique, ILS airborne receivers actualy equipped in the airplane can be used as the first to the third airborne receiver 12 to 14.

Therefore, the window-passage detection system of the embodiment can be realized with a minimum cost.

Further, the accuracy and the reliability of the ILS, which can detect the course deviation or the height deviation of cm-level, are already well proved through flight examinations and the evaluation tests.

Figure 5:
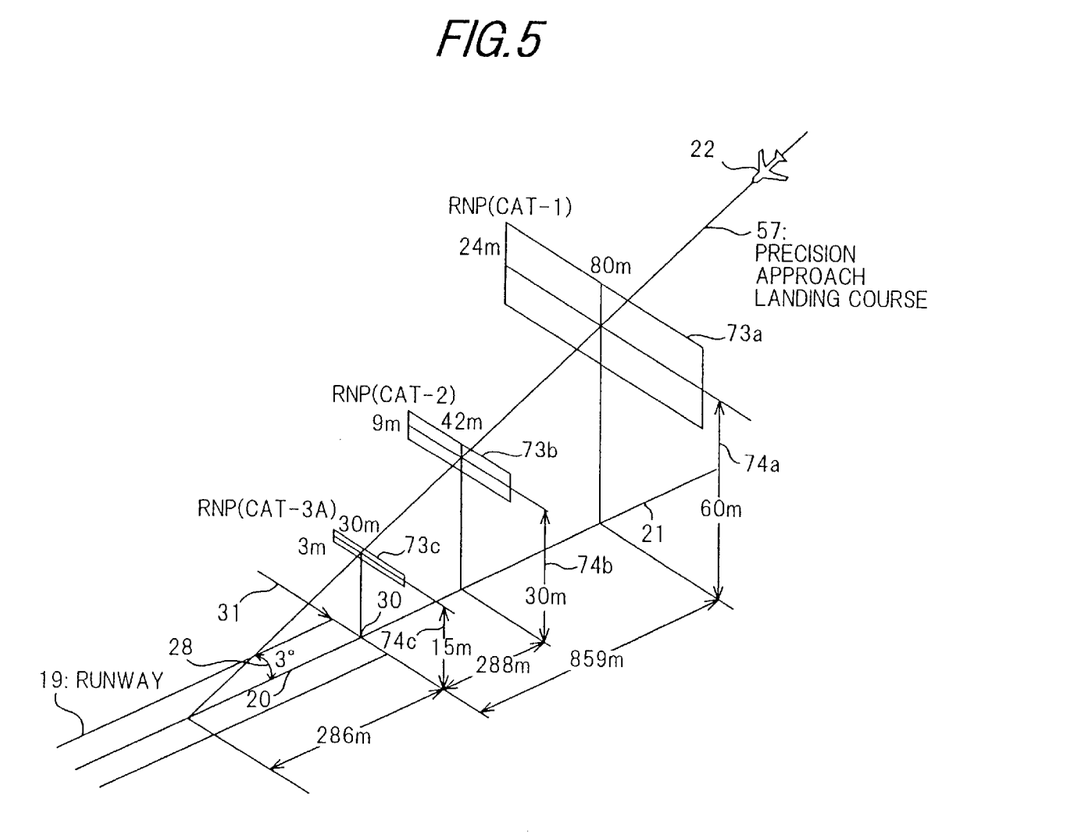
FIG. 5 is a schematic diagram illustrating another embodiment of the invention.

FIG. 5 is a schematic diagram illustrating another embodiment of the invention, wherein three appointed spaces 73a, 73b, 73c, each corresponding to each window frame of three categories CAT-1, CAT-2 and CAT-3A defined in the RNP system precision standard proposed by AWOP of ICAO, are generated along the precision approach landing course 57 of the airplane 22 by three ground systems each having the same configuration with the ground system 1 of FIG. 1A.

The window frame of the CAT-1 is defined to have a horizontal width of ±40 m, a vertical width of ±12 m around a point at the category decision height of 60 m on the precision approach landing course 57 having an elevation angle 28 of 3° to the runway 19. The window frame of the CAT-2 is defined to have a horizontal width of ±21 m, a vertical width of ±4.5 m around a point at the category decision height of 30 m on the precision approach landing course 57, and that of the CAT-3A is defined to have a horizontal width of ±15 m, a vertical width of ±1.5 m around a point at the category decision height of 15 m on the precision approach landing course 57.

The category decision height together with its allowable limits, which is defined according to each of categories attributed to runways, indicates a minimum height until which the airplane can fall according to instrument landing. For example, category decision height 74a of the appointed space 73a according to RNP CAT-1 indicates that the runway 19 should be recognized with pilot's eye before the airplane 22 falls at a height of 60±12 m in the precision approach landing, category decision height 74b of the appointed space 73b according to RNP CAT-2 indicates that the runway 19 should be recognized with pilot's eye before the airplane 22 falls at a height of 30±4.5 m and category decision height 74c of the appointed space 73c according to RNP CAT-3A indicates that the runway 19 should be recognized with pilot's eye before the airplane 22 falls at a height of 15±1.5 m.

When the runway 19 cannot be recognized at the category decision height, the precision approach landing should be abandoned to be tried again.

In the embodiment of FIG. 5, three appointed spaces 73a, 73b and 73c are generated each according to three categories CAT-1, CAT-2 and CAT-3A making use of three window-passage detection systems. However, more than three window-passage detection systems may be provided along the precision approach landing course 57 for detecting positions of the airplane substantially continuously.

In the following paragraphs, more detailed example of the window-passage detection system according to the above embodiments will be described.

According to ANNEX 10 of ICAO standard, usable transmission frequency range other than a nominal ILS frequency of $f_0$ is defined to be within $f_0 \pm \Delta f_1$ and $f_0 \pm \Delta f_2$.

Therefore, the first transmitter 41 is designed to generates the first carrier signal 53a by amplitude-modulating (20% in this example) the first base frequency of the nominal ILS frequency of $f_0$ with the first and the second modulation signal of 90 Hz and 150 Hz synchronized with each other, and the first side-band signal 54a by balanced-modulating the first base frequency with an inverted signal of the first modulation signal of 90 Hz and the second modulation signal of 150 Hz having the same phase with that for generating the first carrier signal 53a.

The second transmitter 42 is designed to generates the second carrier signal 53b by amplitude-modulating (20%) the second base frequency $f_0 + \Delta f$, a little different from the nominal ILS frequency within the above range ($f_0 \pm \Delta f_1$ to $f_0 \pm \Delta f_1$) with the first and the second modulation signal of 90 Hz and 150 Hz synchronized with each other, and the first side-band signal 54b by balanced-modulating the second base frequency with the inverted signal of the first modulation signal of 90 Hz and the second modulation signal of 150 Hz having the same phase with that for generating the first carrier signal 53b.

And, the third transmitter 43 is designed to generates the third carrier signal 53c by amplitude-modulating (20%) the third base frequency $f_0 - \Delta f$, also a little different from the nominal ILS frequency within the above range ($f_0 \pm \Delta f_1$ to $f_0 \pm \Delta f_1$) with the first and the second modulation signal of 90 Hz and 150 Hz synchronized with each other, and the first side-band signal 54c by balanced-modulating the second base frequency with the inverted signal of the first modulation signal of 90 Hz and the second modulation signal of 150 Hz having the same phase with that for generating the first carrier signal 53c.

Above setting of the first to the third base frequency is intending to make good use of frequency capturing characteristic of the first to the third airborne receiver 12 to 14, wherein frequency components scarcely different from a tuned frequency is sharply suppressed. For the purpose, oscillation frequencies of the first to the third oscillator 38 to 40 is designed to be $f_0$, $f_0+4$ kHz, and $f_0-4$ kHz, respectively.

Referring to FIG. 4, each of the first to the third base frequency having a fixed level generated by each of the first to the third oscillators 38 to 40 is supplied to the splitter 63, and split to both the carrier modulator 64 and the side-band modulator 67.

The base frequency supplied to the carrier modulator 64 is amplitude-modulated with addition of the first and the second modulation signal, amplified through the carrier amplifier 65 and output as the carrier signal 53 to be used as respective each of the first to the third carrier signal 53a to 53c. Meanwhile, a part of the carrier signal 53 is picked out by the carrier coupler 66 to be fed back to the carrier modulator 64 as the carrier feedback signal 70, for obtaining high stability and low distortion of the carrier signal 53.

On the other hand, the base frequency supplied to the side-band modulator 67 is balanced-modulated with differential of the first and the second modulation signal, amplified through the side-band amplifier 68 and output as the side-band signal 54 to be used as respective each of the first to the third side-band signal 54a to 54c. Meanwhile, a part of the side-band signal 54 is picked out by the side-band coupler 69 to be fed back to the side-band modulator 67 as the side-band feedback signal 71, for obtaining high stability and low distortion of the side-band signal 54.

The first and the second modulation signal of 90 Hz and 150 Hz, which are synchronized, used in each of the first to third transmitter 41 to 44 are also synchronized with each other at intervals of 30 Hz making use of a synchronous signal 72.

As previously described, each of the first to the third carrier signals 53a to 53c is emitted from each pair of the first to the third transmission antennae 6a, 6b to 8a 8b, with the same phase, and each of the first to the third side-band signals 54a to 54c is emitted from each pair of the first to the third transmission antennae 6a, 6b to 8a 8b, with the inverse phase.

The distance $d_1$ between two antenna elements of the at least one pair of the first transmission antennae 6a and 6b are set to be about one wavelength so as to generate a polarization plane in parallel to a horizontal direction of the appointed space 24. In the same way, the distance $d_2$ between two antenna elements of the at least one pair of the second transmission antennae 7a and 7b are set to be about one wavelength so as to generate a polarization plane in parallel to a vertical direction of the appointed space 24, and the distance $d_3$ between two antenna elements of the at least one pair of the third transmission antennae 8a and 8b are set to be about one wavelength so as to generate a polarization plane in parallel to a normal direction of the appointed space 24.

The first transmission antennae 6a and 6b are arranged as follows.

First, a reference point 30 is defined at a cross point of a perpendicular (hereafter called the z-axis 34) of a point on the precision approach landing course 57 at the category decision height 23 and the center line 20 or the extension 21 of the center line 20 (called the x-axis 32). Then, on a line (called the y-axis 33) including the reference point 30 and perpendicular to both the x-axis 32 and the z-axis 34, the first transmission antennae 6a and 6b are arranged symmetrically to the z-axis 34 separated with the distance $d_1$.

As to the second transmission antennae 7a and 7b, a line (called z'-axis 37) parallel to the z-axis 34 and perpendicular to the y-axis appropriately separated from the runway 20 according to circumstances of the airport, and a line (called y'-axis 36) parallel to the y-axis 33 and crossing both the z-axis 34 and the z'-axis 37 at the category decision height 23 are defined. Then, the second transmission antennae 7a and 7b are arranged on the z'-axis 37 symmetrically to the y'-axis 36 separated with the distance $d_2$.

The third transmission antennae 8a and 8b are arranged on an x'-line 35 including the cross point of the y'-axis 36 and the z'-axis 37 and parallel to the x-axis 32, symmetrically to the y'-axis 36 separated with the distance $d_3$.

The distances $d_1$, $d_2$ and $d_3$ are preferably to be sufficiently large so that mutual coupling effect of the two antenna elements may be neglected. In the above example, they are separated with each other about one wavelength.

In the airborne system 2, each of the first to the third reception antenna 9 to 11, arranged orthogonal with each other, receives each of spatially synthesized electric fields generated by the three pairs of the first to the third transmission antennae 6a, 6b to 8a 8b thus arranged. Each of the first to the third airborne receiver 12 to 14 outputs a signal in proportion to each DDM of the spatially synthesized electric fields. The first detector 15 enables the horizontal width detection signal 58 when output of the first airborne receiver 12 is $-HDDM \leq DDM \leq +HDDM$, the second detector 16 enables the vertical width detection signal 59 when output of the second airborne receiver 13 is $-VDDM \leq DDM \leq +VDDM$, and the third detector 17 enables the threshold passing signal 60 when output of the third airborne receiver 14 becomes zero.

The AND detector 18 outputs the window-passage detection signal 61 when the horizontal and the vertical width signal 58 and 59 and the threshold passing signal 60 are all enabled.

With the window-passage signal 61, the pilot takes final decision whether the landing is to be accomplished or abandoned to be tried again.

As heretofore described, on the precision approach landing course making use of the DGPS, a precise window frame satisfying the RNP system precision standard proposed by AWOP of ICAO can be generated with the first to the third course generator 3 to 5 of the invention, enabling to detect passage of the appointed space instantaneously at airborne side with cm-order precision.

Furthermore, the first to the third course generator 3 to 5 and the first to the third airborne receiver 12 to 14 can be realized by applying actual ILS technique. Therefore, the window-passage detection system can be embodied with a minimum cost, according to the invention.

What is claimed is:

1. A window-passage detecting system of an airplane having at least one ground system each comprising:

a first course generator for generating a horizontal DDM (Differential Depth of Modulation) pattern for defining a horizontal width of a virtual window frame through which a precision approach landing course of an airplane is set, by emitting a first carrier signal and a first side-band signal at the same time upwards toward the virtual window frame from a pair of first transmission antennae provided under the virtual window frame and arranged horizontally and line-symmetrically to a center line of a runway to generate a polarization plane parallel to a horizontal direction of the virtual window frame, said first carrier signal being obtained by amplitude-modulating a first base signal of a first frequency with a first and second modulation signal synchronized with each other, said first side-band signal being obtained by balanced-modulating the first base signal with the first modulation signal whereof phase is inverted and the second modulation signal, one of said first transmission antennae being supplied with the first side-band signal and the first carrier signal, and the other of said first transmission antennae being supplied with the first side-band signal whereof phase is inverted and the first carrier signal;

a second course generator for generating a vertical DDM pattern for defining a vertical width of the virtual window frame, by emitting a second carrier signal and a second side-band signal at the same time in the horizontal direction toward the virtual window frame from a pair of second transmission antennae provided sideways of the virtual window frame and arranged vertically and line-symmetrically to a horizontal line orthogonal to the center line and crossing with the precision approach landing course to generate a polarization plane parallel to a vertical direction of the virtual window frame, said second carrier signal being obtained by amplitude-modulating a second base signal of a second frequency which is a little shifted from the first frequency with the first and the second modulation signal, said second side-band signal being obtained by balanced-modulating the second base signal with the first modulation signal whereof a phase is inverted and the second modulation signal, one of said second transmission antennae being supplied with the second side-band signal and the second carrier signal, and the other of said second transmission antennae being supplied with the second side-band signal whereof a phase is inverted and the second carrier signal; and a third course generator for generating a longitudinal DDM pattern for defining a longitudinal position of the virtual window frame, by emitting a third carrier signal and a third side-band signal at the same time in the horizontal direction toward the virtual window frame from a pair of third transmission antennae provided sideways of the virtual window frame and arranged horizontally and line-symmetrically to the horizontal line orthogonal to the center line and crossing with the precision approach landing course to generate a polarization plane parallel to a normal direction of the virtual window frame, said third carrier signal being obtained by amplitude-modulating a third base signal of a third frequency which is a little shifted from both of the first and the second frequency with the first and the second modulation signal, said third side-band signal being obtained by balanced-modulating the third base signal with the first modulation signal whereof a phase is inverted and the second modulation signal, one of said third transmission antennae being supplied with the third side-band signal and the third carrier signal, and the other of said third transmission antennae being supplied with the third side-band signal whereof a phase is inverted and the third carrier signal.

2. A window-frame passage detection system of an airplane as recited in claim 1; each of the first to the third course generator comprising:

an attenuator for controlling amplitude of respective each of the first to the third side-band signal;

a splitter/synthesizer for splitting respective each of the first to the third carrier signal into two signals each to be supplied with the same phase to each of respective each pair of the first to the third transmission antennae, and splitting respective each of the first to the third side-band signal into two signals each to be supplied with a phase 180° different with each other to each of respective each pair of the first to the third transmission antennae; and a phase shifter for controlling phases of signals to be supplied to one of respective each pair of the first to the third transmission antennae.

3. A window-frame passage detection system of an airplane as recited in claim 1; wherein the virtual window frame generated by each of said at least one of ground system is arranged appropriately separated from each other when said at least one is more then one;

the horizontal width of the virtual window frame is set to represent an allowable horizontal deviation of an airplane approaching according to the precision approach landing course at a point of the precision approach landing course where the virtual window frame is generated, by controlling an amplitude ratio between the first carrier signal and the first side-band signal with the attenuator of the first course generator of said corresponding each of said at least one ground system; and the vertical width of the virtual window frame is set to represent an allowable vertical deviation of the airplane at the point, by controlling an amplitude ratio between the second carrier signal and the second side-band signal with the attenuator of the second course generator of said corresponding each of said at least one ground system.

4. A window-frame passage detection system of an airplane as recited in claim 3; wherein height of said point of the precision approach landing course is category decision height of one of categories defined in RNP (Required Navigation Performance) proposed by AWOP (All Weather Operating Panel) of ICAO (International Civil Aviation Organization); and a size of the virtual window frame is the same with allowable deviations defined in the RNP corresponding to the category decision height.

5. A window-frame passage detection system of an airplane as recited in claim 1; wherein the polarization plane generated by each pair of the first to the third transmission antennae is orthogonal to each other.

6. A window-frame passage detection system of an airplane as recited in claim 1, whereof an airborne system provided on an airplane comprises:

a first detector for detecting passage of the airplane inside of the horizontal width of the virtual window frame, from output of a first airborne receiver having a first reception antenna of the same polarization plane with the pair of the first transmission antennae;

a second detector for detecting passage of the airplane inside of the vertical width of the virtual window frame, from output of a second airborne receiver having a second reception antenna of the same polarization plane with the pair of the second transmission antennae;

a third detector for detecting passage of the airplane traversing the longitudinal position of the virtual window frame, from output of a third airborne receiver having a third reception antenna of the same polarization plane with the pair of the third transmission antennae; and an AND detector for detecting passage of the airplane inside of the virtual window frame, from AND logic of outputs of the first to the third detector.

* * * * *